(12) United States Patent
Bowles et al.

(10) Patent No.: US 6,474,701 B1
(45) Date of Patent: Nov. 5, 2002

(54) TUBING CONNECTOR

(75) Inventors: Rodney Gordon Bowles, Great Yarmouth; Barry David Kendle, Hickling, both of (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/180,030
(22) PCT Filed: Apr. 30, 1997
(86) PCT No.: PCT/GB97/01207
§ 371 (c)(1),
(2), (4) Date: Dec. 16, 1998
(87) PCT Pub. No.: WO97/41377
PCT Pub. Date: Nov. 6, 1997

(30) Foreign Application Priority Data

Apr. 30, 1996 (GB) ............................................... 9608870
Nov. 9, 1996 (GB) ............................................... 9623457

(51) Int. Cl.⁷ ................................................. F16L 13/14
(52) U.S. Cl. ..................... 285/382.1; 285/256; 285/382
(58) Field of Search ................................. 285/382, 256, 285/382.1; 29/514–517, 50, 508; 72/402

(56) References Cited

U.S. PATENT DOCUMENTS

| | | | | |
|---|---|---|---|---|
| 1,223,591 | A | * | 4/1917 | Layne |
| 2,788,833 | A | * | 4/1957 | Arnold |
| 3,332,272 | A | * | 7/1967 | Tonchen |
| 3,453,831 | A | * | 7/1969 | Rusche |
| 3,885,298 | A | * | 5/1975 | Pogonowski |
| 5,353,623 | A | * | 10/1994 | Bobenhausen |

* cited by examiner

*Primary Examiner*—Teri Pham Luu
(74) *Attorney, Agent, or Firm*—Moser, Patterson & Sheridan, L.L.P

(57) ABSTRACT

A tubing connector non-releasably connected to a tube of tubing string for use downhole in oil and gas well operations, the connector comprising connector body (1) with an end portion fitted concentrically within or over a corresponding end of the tube (2), the end portion having a plurality of depressions (12) coinciding with corresponding depressions (10) on the corresponding end of the tube (2) whereby the connector body (1) and tube (2) are connected together, the depressions (10) and the tube (2) having been formed by localized plastic deformation of the walls of the tube (2).

12 Claims, 6 Drawing Sheets

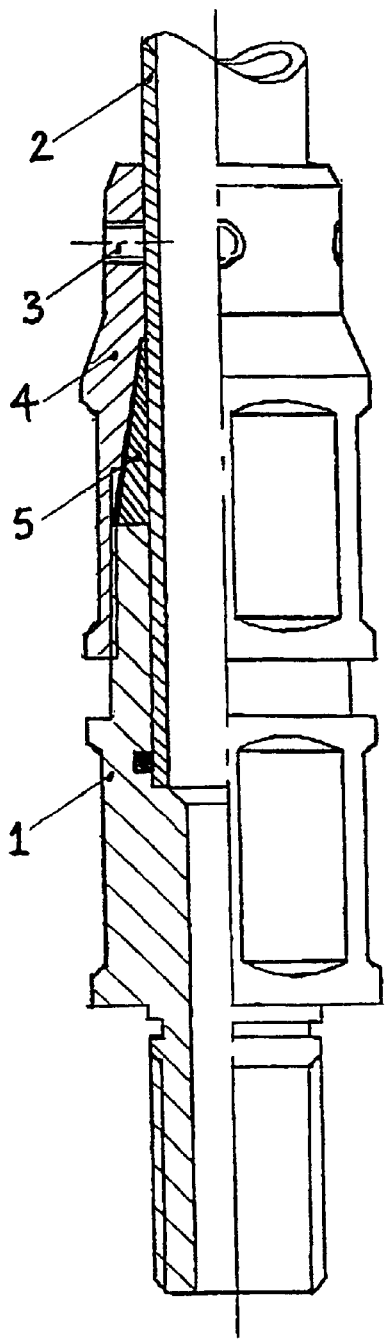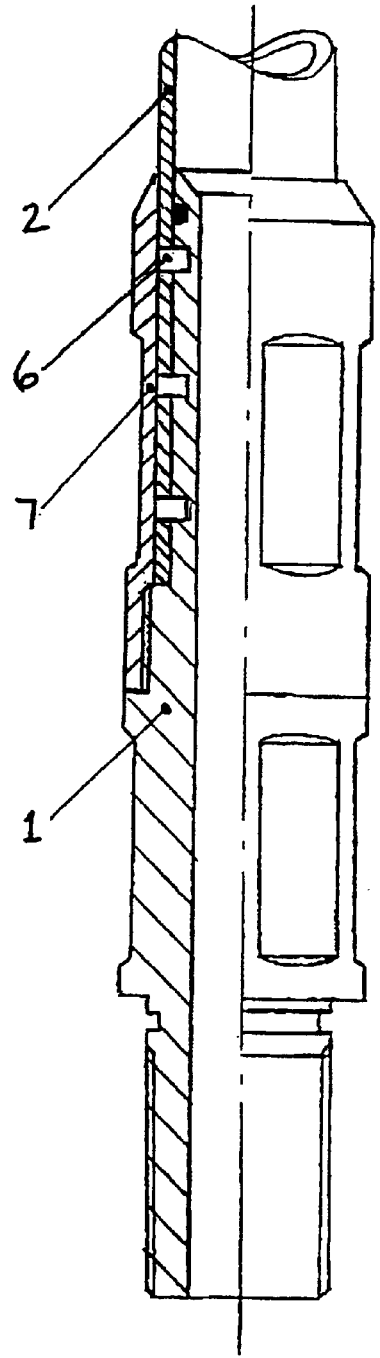
FIGURE 1
(PRIOR ART)
FIGURE 2
(PRIOR ART)

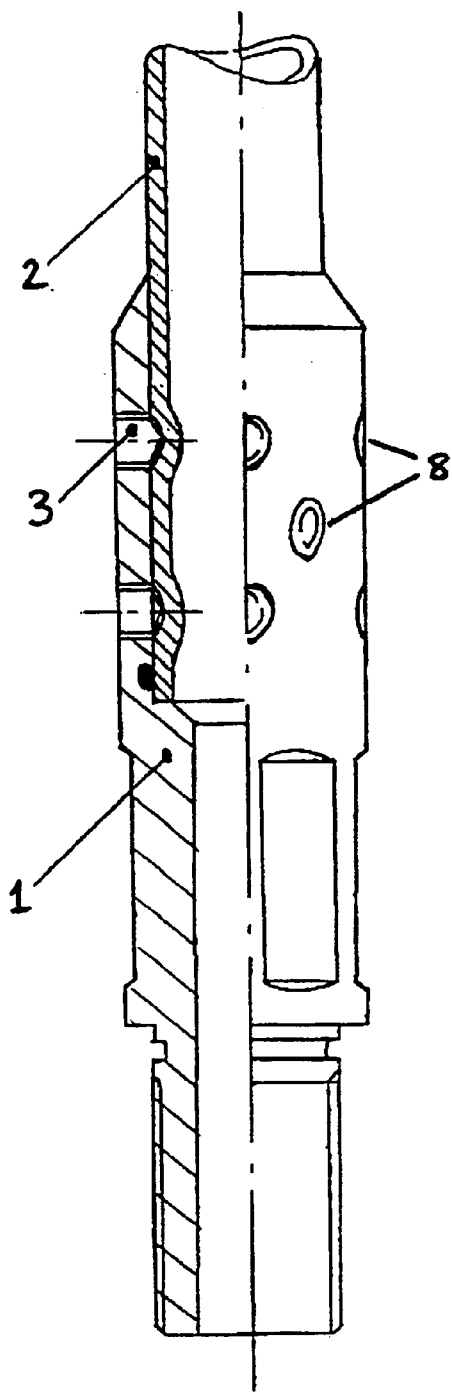
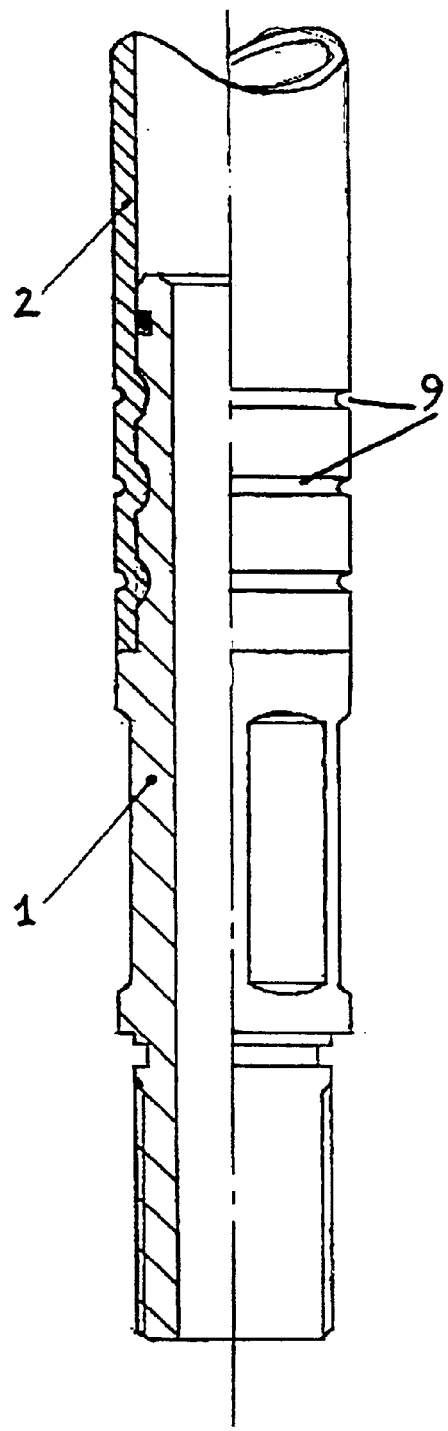
FIGURE 3
(PRIOR ART)
FIGURE 4
(PRIOR ART)

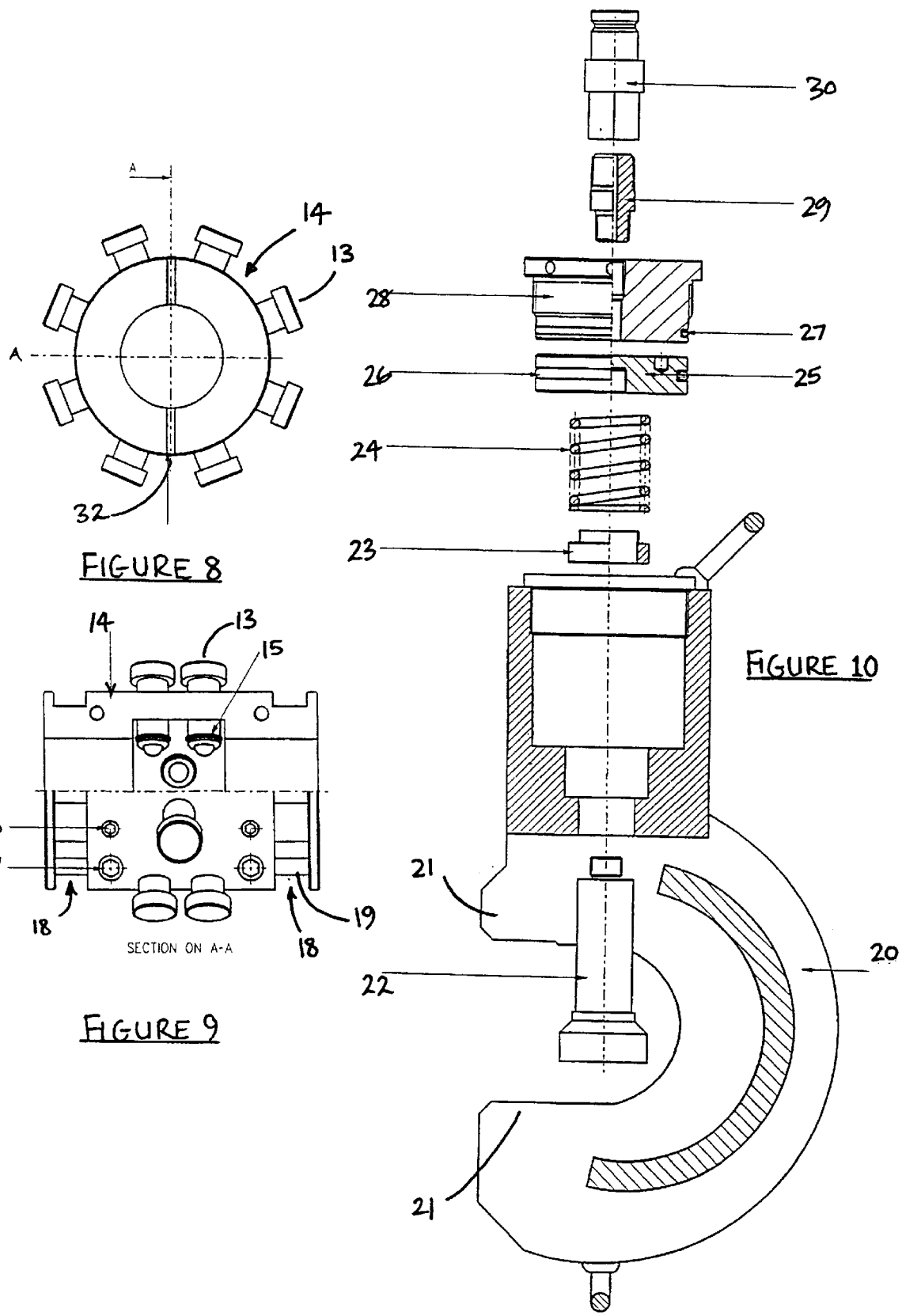

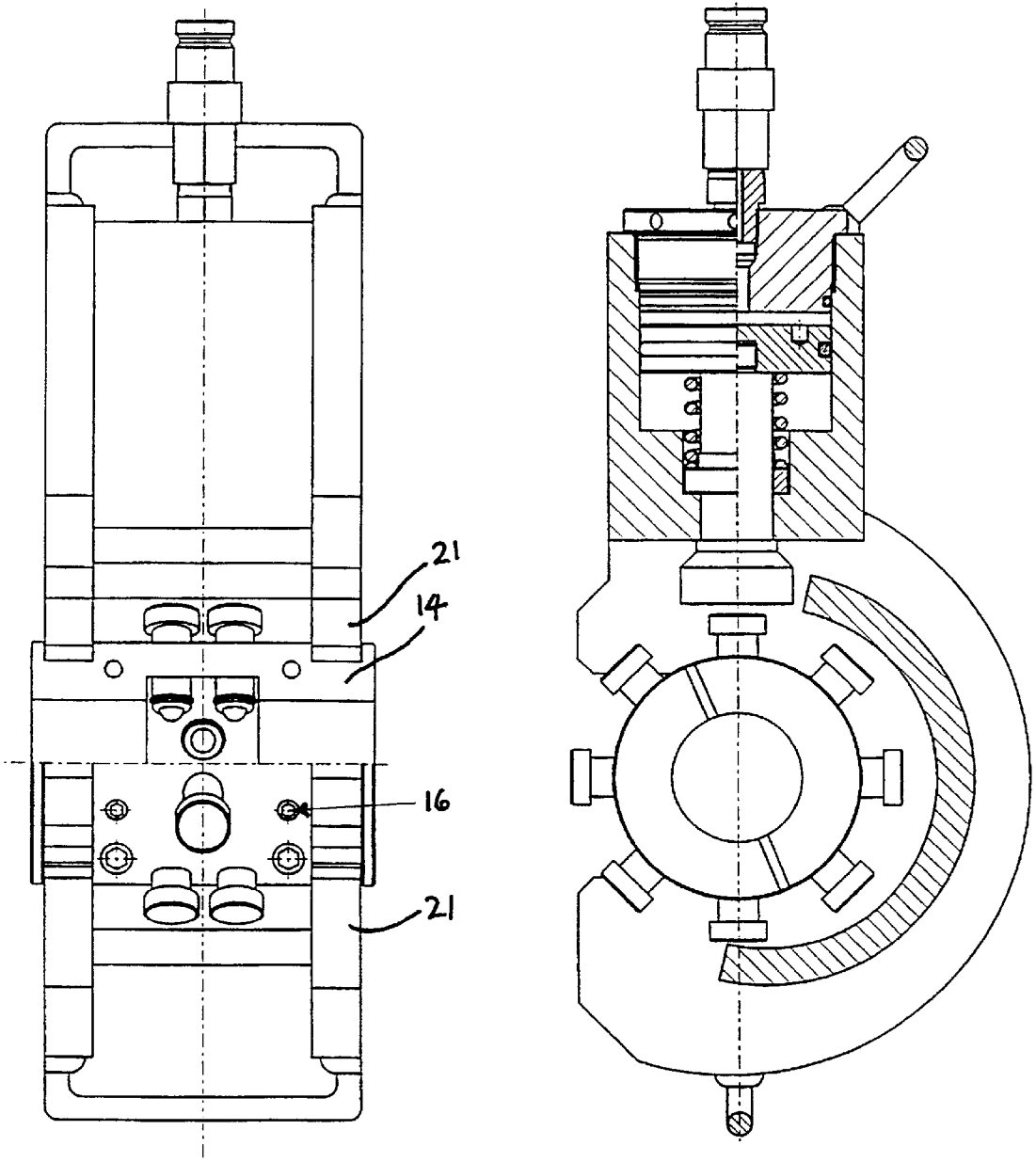
FIGURE 11
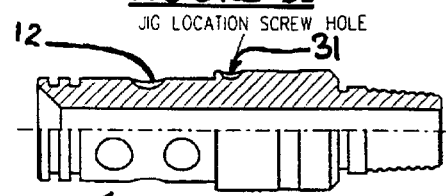
FIGURE 13
FIGURE 12

TUBING CONNECTOR

FIELD OF THE INVENTION

The present invention relates to a tubing connector suitable for use with coiled tubing in oil and gas well operations.

BACKGROUND OF THE INVENTION

Coiled tubing is primarily used to perform maintenance tasks on completed oil and gas wells. The principle of coiled tubing maintenance or 'workover' is to attach a toolstring to the end of a reel of steel tubing. By reeling out the tubing, the toolstring may be lowered many thousands of feet into the well. By either reeling in or reeling out the tubing, the toolstring can be positioned and made to perform simple tasks downhole. The toolstring is retrieved by reeling in the tubing at the end of the task. Because the tubing is moderately rigid, in the same manner as drain rods, it is able to transmit torque and compression. This allows light drilling work and access to deviated sections where gravity alone would not be enough to convey the toolstring. Because coiled tubing is hollow, it is able to pass fluids. This feature may be used to place chemicals accurately at a given depth in the well. It may also be used to provide hydraulic power to the toolstring. The hydraulic power is typically used to activate tools and run hydraulic motors for example when drilling.

The tool string consists of a variable combination of individual tools screwed or otherwise locked together to form a working unit. A typical toolstring would comprise a tubing connector, non-return valves, accelerator, stem, upstroke jar and a running/pulling tool or motor and bit. The tubing connector joins the toolstring to the coiled tubing. Non-return or check valves are needed since the tubing passes through the wellhead seals. If the tubing broke at surface the non-return valves in the toolstring would shut and prevent escape of the well fluids. An accelerator stores energy in a spring system for use when hammering or 'jarring'. The stem is lengths of dense tubing, the mass of which increases the momentum of the hammer blow when jarring. The upstroke jar is a latching slide hammer arranged so that the slide is latched closed until sufficient tension is applied to the toolstring via the tubing. The applied tension also compresses the springs in the accelerator, storing a measure of energy. When the jar latch releases, the jar rod and attached stem are accelerated by the stored energy. At the end of the jar rod travel the rod and stem are suddenly stopped giving a powerful hammer action. Setting the toolstring down after activating the upstroke jar pushes the jar rod back to the start of its travel and resets the latch. At the end of the toolstring there may be a running/pulling tool. This interfaces with equipment to be left in or retrieved from the well. In many cases a shear pin will need to be fractured to activate the running/pulling tool, thus the requirement for a hydraulically effect from the jar. Even if the running/pulling tool is hydraulically activated then, due to the arduous conditions of heat and contaminants downhole, mechanisms and interlocking parts can become jammed and require blows to free them. Alternatively, the coiled tubing tool string may end in a hydraulic motor and some form of drill bit or cutter. This equipment would be used for clearing obstructions or for deepening the well.

Another use for coiled tubing, especially in larger diameters, is as a permanent fixture in the well through which the oil or gas will be produced. This one-time deployment is often termed a hang-off. A coiled tubing hang-off is a fast and economical alternative to deploying screw-jointed tubulars. The tubing in the hang-off is suspended from and sealed to the existing well steelwork by a top connector. Typically the bottom tubing connector attaches filters, e.g. sand-screens or an electric submersible pump (ESP).

From the above descriptions it will be seen that the integrity of the connection between tubing and the tool string or hang-off components is of paramount importance. The tubing connector must be permanently secure when subject to large tensile, torque, shock and vibrational loadings. The connector must also allow a quick and foolproof assembly onto the tubing end as it hangs free from the tubing unit. Previous tubing connectors all present serious problems, either in security or assembly. These connectors may be divided into groups dependent upon their structure. Each group is described in turn below.

Grapple connectors, of which a typical example is shown in FIG. 1, use an externally tapered, internally serrated split sleeve to bite onto the coiled tubing and wedge into the connector body. The connector must be firmly assembled to the tubing before operations commence, this requiring large make up torques onto the free hanging tubing end. This is a difficult task. Large pull loads when in use will often cause the grapple to bite deeper onto the tubing and slip in its taper, so loosening the assembly thread which risks subsequent unscrewing and loss down hole. Since the grapple and tapered housing are outside the tubing this type of connector is 'upset' or 'outline' and the increased diameter of the assembly over the tubing diameter can pose an access problem in some wells. This connector is internally flush. The serrations inside the grapple 5 and the grapple location in the taper do not provide a good torque drive. When used for drilling this type of connector is normally enhanced with grub screws 3 through the connector body 1 top portion 4 biting into the tubing 2.

Pinned end connectors, of which a typical example is shown in FIG. 2, use a number of radial pins 6 loaded in shear to maintain a hollow spigot in the end of the tubing. The tubing is cross drilled to accept the pins using a guide jig and a pistol drill. The connector is assembled by placing the spigot in the tubing and pushing the pins through the tubing drilling and into matching blind holes in the spigot. An external sleeve 7 maintains the pins 6 in the connector. The connector transmits torque and tension commendably well but is tricky to assemble because of the predrilling required and the insertion of the small loose pins. The connector is neither internally nor externally flush.

Dimple grub screw connectors, a typical example of which is shown in FIG. 3, are also neither externally nor internally flush. Here the tubing end 2 is plastically worked by a jig so that it presents local depressions or dimples 8 into which grubscrews 3 in the connector 1 can seat. The connector itself is a sleeve which fits over the tubing and is threaded for the grubscrews. The connector has good tensile and torque capability.

Roll-on connectors, a typical example of which is shown in FIG. 4, are externally flush or 'inline' connectors which use an internal spigot-type connector body 1. In this case the spigot is retained by plastically deforming or 'crimping' the tubing into grooves 9 running around the spigot. The deformation is achieved with a manual pipe cutting tool in which the sharp cutting wheel is replaced by a radiused wheel to suit the grooves in the spigot. Some measure of torque transmission can be achieved by stopping one or more of the spigot grooves from being fully circumferential. This increases the difficulty of make up since the rolling tool cannot be run all the way round the tubing but must stop in accordance with the part grooves. The connector has limited tensile strength because of severe stress concentrations. Those, present around the full circumference of the tubing, are introduced by load transfer through the crimped profile.

It is an object of the present invention to overcome these disadvantages with a simple, remarkably robust, torque transmitting tubing connector of novel design that does not significantly diminish the tubing strength at the connection either in torque or in tension.

SUMMARY OF THE INVENTION

According to a first aspect of the present invention there is provided a tubing connector non-releasably connected to a tube of tubing string for use downhole in oil and gas well operations, the connector comprising an end portion fitted concentrically within or over a corresponding end of the tube, the end portion having a plurality of depressions coinciding with corresponding depressions on the corresponding end of the tube whereby the connector body and tube are connected together, the depressions in the tube having been formed by localised plastic deformation of the walls of the tube.

Preferably, the connector body is machined with depressions or through-holes receiving the plastically deformed tube therein. The very great benefit of this arrangement is that it is not restricted to only the very most pliable tubing materials and thicknesses and connector body materials and thicknesses since the plastic dimple-forming process is applied only to the interior or exterior of the tubing and does not need to simultaneously plastically deform the connector body. The resulting connector strengths in torsion and tension are accordingly much greater.

Preferably the local depressions in the tubing are circular through having been formed by an approximately spherical or conical shape impinging on the tube as from a hard ball or cone.

Preferably the connector body is formed having a male/spigot portion inserted into the corresponding end of the tubing.

In this last described arrangement the tubing is suitably locally depressed into mating engagement with the connector body by mounting a jig over the tubing having dimple-forming screws or pins mounted thereon.

The jig is preferably formed as a sleeve and is preferably formed in segments that are hinged together to clamp around the tubing during use of the jig.

The jig suitably has an annular recess extending around each end thereof to enable mounting of a yoke thereto, which yoke has a pneumatic or hydraulic ram to press the dimple-forming screw/pin(s) of the jig into the tubing.

Preferably, where the jig has the aforementioned recesses, those recesses have flat portions spaced around the circumference of the respective recess such that when the yoke is fully engaged the yoke is held both longitudinally of the jig and radially thereof but so that when the jaws of the yoke are only partially relieved the yoke may be radially reoriented around the jig but not moved longitudinally thereof.

According to a second aspect of the present invention there is provided a jig as defined in the preceding statements. According to a third aspect there is provided a yoke as defined in the preceding statements.

Further preferred features of the connector of the invention include that the coincident depressions of the tubing and connector body or coincident depression and hole are formed at more than one stage along the length of the connector body longitudinally of the tubing and, furthermore, that such depressions are provided at radially spaced intervals around the connector body and that the depressions are longitudinally staggered so that no two next radially adjacent depressions are located at the same position along the length of the connector body. This helps to minimise any concentration of points of weakening.

In the present invention where the connector body inserts within the tubing and is inter engaged therewith by action of an externally mounted jig collar it is easier to implement than using the converse arrangement having a jig inserted within the tubing to press the tubing out into the connector body. It avoids the need to insert a jig all the way down the very considerable length of the tubing with attendant difficulties of ensuring proper registration.

Where an internal jig is necessitated, this suitably comprises an elongate jig body having a plurality of balls arranged radially therearound and at longitudinal intervals therealong and which are pressed out into engagement with the tubing by a plurality of longitudinally spaced cam surfaces on the jig.

BRIEF DESCRIPTION OF THE DRAWINGS

The preferred embodiments of the current invention will now be more particularly described by way of example, with reference to the accompanying drawings wherein:

FIGS. 1 to 4 show prior art tubing connectors.

FIG. 8 shows an end elevation of a connector assembly jig which is hinged and clamped such that it can be used for double ended dimple-on connectors and removed from around the pipe when assembly is completed;

FIG. 9 is a longitudinal view of the jig of FIG. 8;

FIG. 10 is a general assembly view illustrating the components of a hydraulic yoke device for pressing the dimpling screws of the jig into the tubing to couple it to the connector body;

FIGS. 11 and 12 are views of the yoke in place around the jig;

FIG. 13 is a view of the connector body to illustrate the position of the jig location screw hole for alignment of the jig with the preformed depressions on the connector body.

DESCRIPTION OF THE PREFERRED EMBODIMENT

The present embodiments represent currently the best ways known to the applicant of putting the invention into practice. But they are not the only way in which this could be achieved. They are illustrated, and will now be described, by way of example only.

The coiled tubing connector described herein relies upon the ductility of the tubing to be connected. Coiled tubing is formed from alloy steels of remarkable strength and ductility in order to withstand the repeated low plastic flexure required in use.

Figures 5, 6, 7:
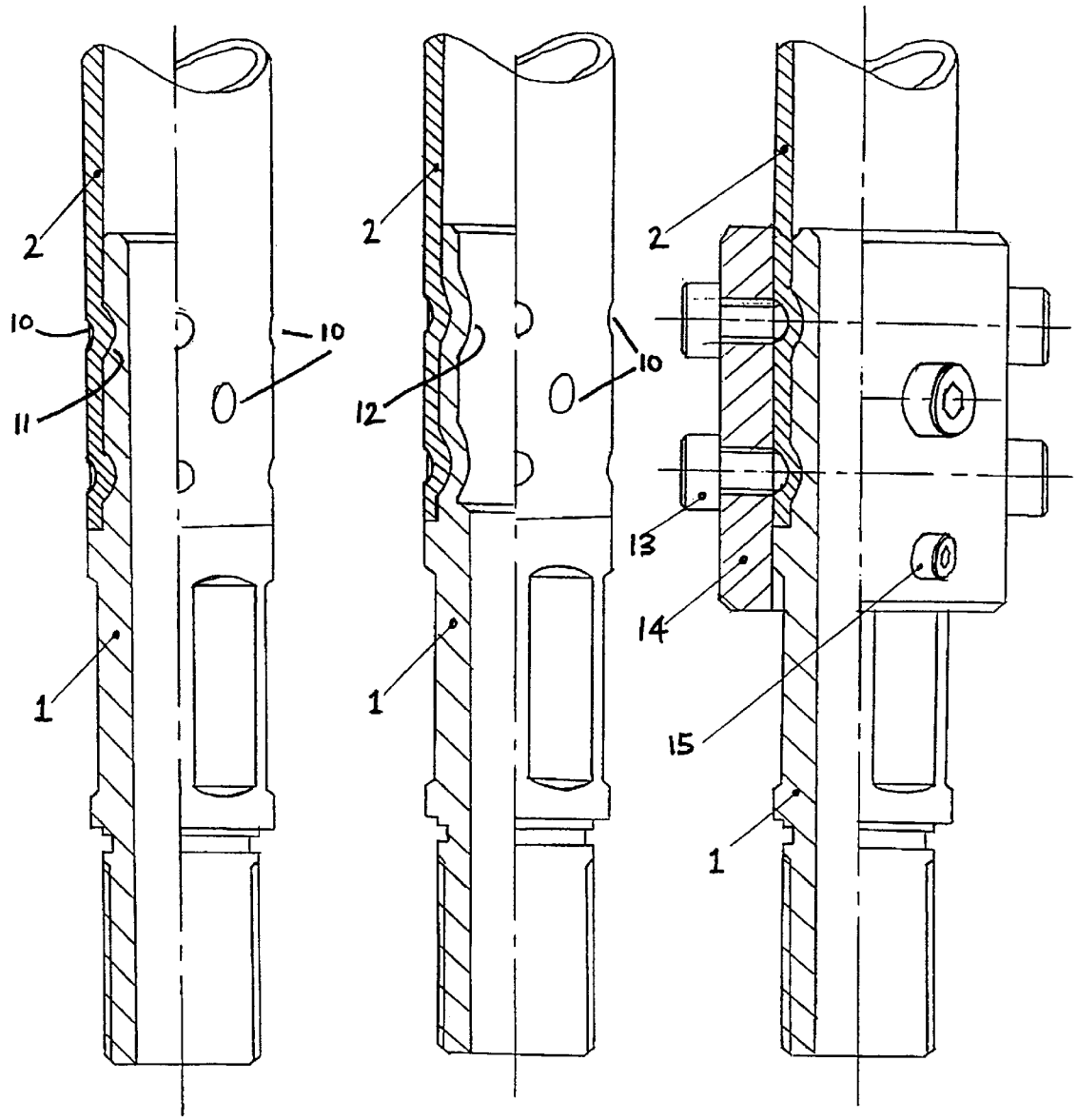
FIG. 5 shows the general arrangement of a first variant of a first preferred major embodiment of the assembled connector sectioned such that the plastically worked depressions are apparent. The coinciding depressions in the connector body are machined.
FIG. 6 shows the general arrangement of a second variant of the first preferred embodiment of the assembled connector. Here the connector body has been plastically deformed in sympathy with the tubing.
FIG. 7 shows the connector assembly jig in its simplest form. Here the jig is a robust cylinder appropriately tapped to take the dimpling screws.

The first embodiment connector as illustrated in FIGS. 5 to 7 is externally flush or 'inline', joining with the tubing 2 by a spigot or mandrel end portion thereof which is inserted into the corresponding tubing end. For coiled tubing the spigot portion would most commonly be hollow to allow the passage of fluids.

The spigot portion of the connector body 1 is retained in the tubing 2 end by plastic deformation or crimping of the tubing 2. Two connectors designs from the prior art, the dimple grubscrew connector and the roll-on connector, also rely on this technique. In the connector of the present invention, the tubing 2 is crimped in small depressions 10 referred to as dimples. Unlike the dimple grubscrew connector, the dimples 10 in the present invention are made in the tubing 2 directly onto the connector body 1 and no further components e.g. grubscrews, are required. The connector is therefore as simple as the roll-on connector.

Unlike The roll-on connector, the plastic work to the tubing 2 in the present invention is local and does not extend the full circumference of the tubing 2. Stress concentrations from load transfer are thus also localised and do not seriously affect the tensile strength of the tubing 2 as they do with the roll-on. The dimples 10 in the tubing 2 may be made into preformed depressions 12 in the spigot as in FIG. 5 or the tubing 2 and the spigot portion of the connector body 1 can be deformed together as in FIG. 6. The dimples are most easily formed by a ball ended or conically pointed screw 13 impinging on the tubing 2 whilst it is clamped in a cylindrical jig 14. The basic form of the jig 14 is shown on FIG. 7. Here the jig 14 is a robust cylinder which is a close fit over the tubing 2. The wall of the cylinder 14 is appropriately threaded to receive the dimpling pins 13. This version of the jig 14 slides on over the connector body 1 and, for the first variant of the first preferred embodiment, locates by a locking screw 15 into a shallow socket (not marked) formed in the connector body 1 outside diameter. This location ensures that the dimple pins 13 force the tubing into the machined locations 12 in the connector body 1 spigot portion.

For use with the second variant of the first preferred embodiment no alignment is necessary and the locking screw and shallow socket may be omitted.

FIGS. 8 and 9 show a jig 14 for dimpling a tubing 2 to tubing 2 connector 1. The jig 14 is split and hinged 32, clamping onto the tubing 2 during use. After the connector is assembled, the clamp is undone and the jig 14 hinged open and removed.

As can be seen from FIG. 9, the jig 14 for impressing the tubing 2 into the depressions 12 of the connector body 1 is modified from the form shown in FIG. 7 and comprises a cylindrical collar that has annular recesses 18 around each end thereof. Each of these annular recesses has a number of circumferentially spaced flat regions 19 the purpose of which will become apparent in the description of operation hereinafter.

The dimple pins 13 projecting radially through the jig 14 are held in place by snap rings 15.

The jig 14 further has a jig location screw 16 and a caphead screw 17.

The hydraulically operated yoke illustrated in FIGS. 10, 11 and 12 provides the means by which the dimple pins 13 of the jig 14 are pressed to deform the metal of the tubing 2 into the corresponding pre-formed depressions 12 of the connector body 1.

The componentry of the yoke comprises jaws 21 that may be advanced together to clamp against the flat surfaces 19 of the recesses 18 on the jig 14.

A hydraulic ram 22 is extendible into the zone between the jaws 21 and is operated against a return spring 24 having a spring seat 23.

Hydraulic pressure supplied to a piston 25 behind the ram 22 is supplied via a quick-release hose fitting 30 through an adapter 29 to the piston 25. The yoke further comprises an end cap 28 and the end cap 28 and piston 25 each have respective sealing O-rings 27 and 26.

When assembling the connector, the tubing 2 is first prepared as would normally be the case for a roll-on connector. The spigot portion of the connector body 2 is then inserted into the corresponding end of the tubing 2 until the joint is flush and the dimple jig alignment hole is situated at the outer diameter of the connector body 1 adjacent to the tubing 2 end.

The jig 14 is then fitted over the connector and the jig location screw 16 is aligned and locked into the corresponding jig location screwhole 31 on the connector body 1.

The hydraulic yoke 20 is then fitted over the jig 14 such that when fully engaged the jaws 21 of the yoke 20 rest against the flat surfaces 19 of the jig recesses 18. The ram 22 of the yoke 20 is then operated to press the dimple pin 13 or pair of pins 13 thereunder to correspondingly press the tubing 2 into the depressions 12 of the connector body 1.

When the pressure from the ram 22 of the yoke 20 is relieved, the engagement of the yoke jaws 21 is also relieved sufficiently to not disengage them from within the recesses 18 but nonetheless to disengage them from the flat surfaces 19 and enable the yoke 20 to be rotated around the jig 14 until the ram 22 lies over the next dimple pin 13 or pair of dimple pins 13 moving radially around the jig 14.

In practise, the yoke needs only to operate at levels of 3,500 psi for single dimple screw/pin 13 actuation and a level of just under double this for paired such screw/pins 13. The hydraulic pressure from the ram 22 is relieved immediately the indentation has been made, and once all dimple screws 13 have been actuated the yoke 20 may be disengaged from the jig 14 and the jig then disengaged from the connector by hinging it open.

The apparatus and procedure of the invention as thus described is extremely fast and efficient in use and provides a finish to the connector that is externally flush with the tubing and with a larger through-bore than conventional roll-on connectors. The tubing strength at the connection both in tension and torsion is not significantly diminished and torque may be transmitted through the connector sufficient for drilling operations.

By virtue of having a flush exterior the tubing may be easily spooled when desired and the strength characteristics of the connector enable it to withstand heavy jarring and drilling operations.

A second major embodiment of the tubing connector will now be described hereinafter.

Figure 14:
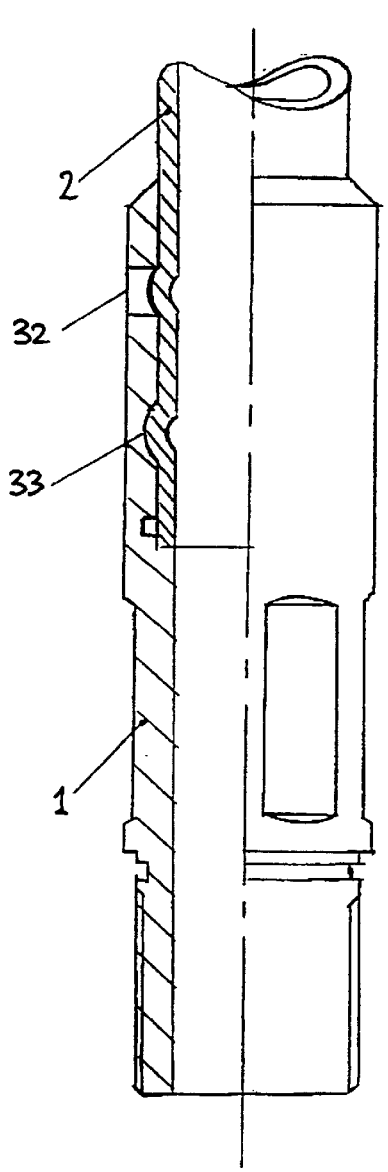
FIG. 14 shows the general arrangement of a second major embodiment of the assembled connector sectioned such that the plastically worked depressions are apparent. The connector cylinder is as the first variant of the first preferred embodiment insofar as the coinciding depressions or holes in the spigot are machined prior to use.
Figure 15:
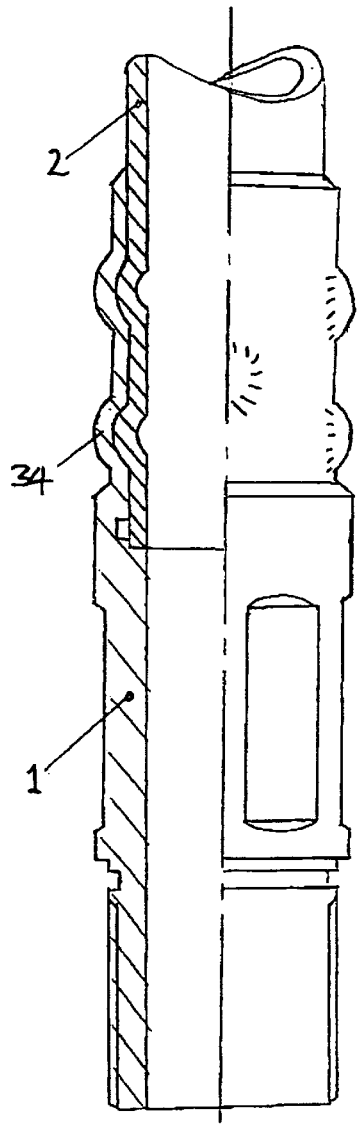
FIG. 15 shows the general arrangement of a second variant of the second major embodiment of the assembled connector. Here the connector body has been plastically deformed in sympathy with the tubing.
Figure 16:
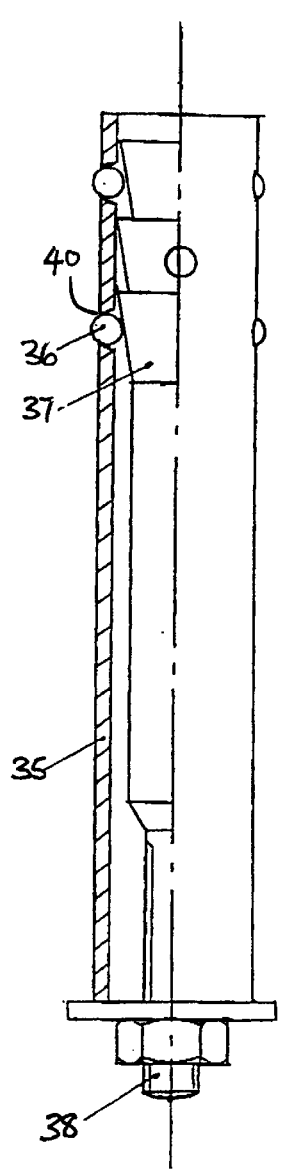
FIG. 16 shows a jig for use in the second major embodiment in its simplest form. Here the jig is a cylinder appropriately perforated to locate the dimpling balls. A conical wedge, drawn by a bolt, forces the balls outwards and thus dimples the inside of the tubing.

See FIGS. 14 and 15 respectively. In one application, the dimples are most easily formed by a hardened ball 36 or cone impinging on the tubing and activated by an inserted jig mechanism 35. The basic form of the jig 35 is shown on FIG. 16. Here the jig 35 is a cylinder having a plurality of cam surfaces 37 along its length, and which fits through the connector 1 and up inside the tubing 2. The wall of the jig 35 is appropriately perforated 40 to locate the dimpling balls which will ride up the cam surfaces 37 of the jig 35. For a first preferred variant, the jig 35 locates by a nib engaging a shallow socket formed in the connector inside diameter. This location ensures that the dimpling balls 36 force the tubing 2 into machined locations 40 in the connector body 1. In a second variant in which there are no preformed depressions or holes 40 in the connector body 1 and depressions are formed in sympathy with those in the tubing 2 no alignment is necessary and the nib and shallow socket are omitted. In use, rotating the draw bolt 38 of the jig 35 causes the widest part of the cam surfaces/conical wedges 37 to become aligned with the dimpling balls 36, causing the necessary dimpling in the tubing 2.

In distinction to the well known prior art techniques the connector of the present invention combines the tensile and torque strength attributes of the grubscrew dimple connector with the ease of assembly of the roll-on connector.

What is claimed is:

1. A tubing connector body of the type for joining oil or gas well tubing string to coil tubing connected to a tube of oil or gas well tubing string for use downhole in oil or gas well operations, the connector body comprising a male/spigott end portion fitted concentrically within a corresponding end of the tube, the end portion having a plurality of depressions or holes preformed to receive and coinciding with localised depressions formed by plastic deformation of the walls of the tube whereby the connector body and tube are connected together; in combination with a jig, wherein the tubing is locally depressed into mating engagement with the connector body by mounting of the jig over the tubing, the jig having dimple-forming pins, each adapted to be pressed by pneumatic or hydraulic ram to form the dimples, wherein the jig is formed as a segmented sleeve which is assembled and disassembled around the connector body.

2. A tubing connector body and jig as claimed in claim 1, wherein the depressions in the connector body are circular.

3. A tubing connector body and jig as claimed in claim 1, wherein the depressions in the tubing are circular through having been formed by an approximately spherical shape such as a hard ball impinging on the tubing.

4. A tubing connector body and jig as claimed in claim 1, wherein the depressions in the tubing are conical through having been formed by an approximately conical shape such as a cone impinging on the tubing.

5. A tubing connector body as claimed in claim 1, wherein the depressions of the connector body are formed at more than one stage along the length of the connector body longitudinally of the tubing and such depressions are provided at circumferentially spaced intervals around the connector body.

6. A tubing connector body as claimed in claim 5, wherein the depressions are longitudinally staggered so that no two next circumferentially adjacent depressions are located at the same stage along the length of the connector body.

7. A tubing connector body of the type for joining oil or gas well tubing string to coil tubing connected to a tube of oil or gas well tubing string for use downhole in oil or gas well operations, the connector body comprising a male/spigott end portion fitted concentrically within a corresponding end of the tube, the end portion having a plurality of depressions or holes preformed to receive and coinciding with localised depressions formed by plastic deformation of the walls of the tube whereby the connector body and tube are connected together; in combination with a jig, wherein the tubing is locally depressed into mating engagement with the connector body by mounting of the jig over the tubing, the jig having dimple-forming pins, each adapted to be pressed by pneumatic or hydraulic ram to form the dimples; and further in combination with a yoke having jaws, wherein the jig has an annular recess extending around an or each end thereof to enable mounting of the jaws of the yoke thereto, which yoke has a pneumatic or hydraulic ram to press the dimple forming pin(s) of the jig into the tubing.

8. A tubing connector body and jig as claimed in claim 7, wherein each recess of the jig has flat portions spaced around the circumference of the recess such that when the yoke is fully engaged the yoke is held both longitudinally of the jig and radially thereof but so that when the jaws of the yoke are only partially relieved the yoke may be moved around the jig but not moved longitudinally thereof.

9. A jig for use in forming the tubing connector body of the type for joining oil or gas well tubing string to coil tubing connected to a tube of oil or gas well tubing string for use downhole in oil or gas well operations, the connector body comprising a male/spigott end portion fitted concentrically within a corresponding end of the tube, the end portion having a plurality of depressions or holes preformed to receive and coinciding with localised depressions formed by plastic deformation of the walls of the tube whereby the connector body and tube are connected together; said jig comprising a sleeve to fit over the tube end portion and having a plurality of dimple forming pins each adapted to be pressed by a pneumatic or hydraulic ram to form the dimples and wherein the jig is formed as a segmented sleeve which is assembled and disassembled around the connector body.

10. A jig as claimed in claim 9, wherein the jig has an annular recess extending around an or each end thereof to enable mounting of the jaws of a yoke thereto, which yoke has a pneumatic or hydraulic ram to press the dimple forming pin(s) of the jig into the tubing.

11. A jig as claimed in 9, wherein the recesses of the jig have flat portions spaced around the circumference of the recess such that when the yoke is fully engaged the yoke is held both longitudinally of the jig and radially thereof but so that when the jaws of the yoke are only partially relieved the yoke may be moved around the jig but not moved longitudinally thereof.

12. A yoke having jaws for use with the jig and tube connector body of the type for joining oil or gas well tubing string to coil tubing connected to a tube of oil or gas well tubing string for use downhole in oil or gas well operations, the connector body comprising a male/spigott end portion fitted concentrically within a corresponding end of the tube, the end portion having a plurality of depressions or holes preformed to receive and coinciding with localised depressions formed by plastic deformation of the walls of the tube whereby the connector body and tube are connected together; in combination with a jig, wherein the tubing is locally depressed into mating engagement with the connector body by mounting of the jig over the tubing, the jig having dimple-forming pins, each adapted to be pressed by pneumatic or hydraulic ram to form the dimples, wherein the jig is formed as a segmented sleeve which is assembled and disassembled around the connector body, wherein the yoke is adapted to mount around the jig with its jaws extending over opposing sides of the jig only partially encircling the jig and has a pneumatic or hydraulic ram to press the dimple forming pins of the jig into the tubing, the yoke being adapted to be moved around the jig to press each circumferentially spaced pin or pins of the jig in turn.

* * * * *